(12) United States Patent
Beck et al.

(10) Patent No.: US 11,523,125 B2
(45) Date of Patent: Dec. 6, 2022

(54) DRONE VIDEO COMPRESSOR FOR REMOTE VIDEO VIEWING

(71) Applicant: Special Services Group, LLC, Denair, CA (US)

(72) Inventors: Elizabeth A. Beck, Denair, CA (US); Clifford W. A. Emery, Denair, CA (US); Andrew J. Ashworth, Evergreen, CO (US)

(73) Assignee: Special Services Group, LLC, Denair, CA (US)

( * ) Notice: Subject to any disclaimer, the term of this patent is extended or adjusted under 35 U.S.C. 154(b) by 404 days.

(21) Appl. No.: 16/708,476

(22) Filed: Dec. 10, 2019

(65) Prior Publication Data
US 2020/0195938 A1 Jun. 18, 2020

Related U.S. Application Data

(60) Provisional application No. 62/779,974, filed on Dec. 14, 2018.

(51) Int. Cl.
*H04N 19/184* (2014.01)
*B64C 39/02* (2006.01)
*H04N 7/18* (2006.01)

(52) U.S. Cl.
CPC ......... *H04N 19/184* (2014.11); *B64C 39/024* (2013.01); *H04N 7/185* (2013.01); *B64C 2201/127* (2013.01)

(58) Field of Classification Search
CPC .................................................. H04N 18/184
See application file for complete search history.

(56) References Cited

U.S. PATENT DOCUMENTS

| 7,460,148 B1 | 12/2008 | Clark et al. |
| 7,546,187 B2 | 6/2009 | Bodin et al. |
| 9,915,946 B2 | 3/2018 | Poole et al. |
| 10,038,841 B1* | 7/2018 | Davey ................ H04N 21/4728 |
| 10,244,168 B1* | 3/2019 | Alam ................ H04N 5/23238 |
| 2019/0173935 A1* | 6/2019 | Loh ..................... H04N 21/4223 |
| 2019/0173939 A1* | 6/2019 | Lewis .................... G06Q 50/01 |
| 2020/0036644 A1* | 1/2020 | Belogolovy .......... H04L 1/0014 |
| 2020/0162458 A1* | 5/2020 | Setlur ................ H04N 21/4402 |
| 2020/0195938 A1* | 6/2020 | Beck ..................... H04N 19/184 |
| 2021/0194674 A1* | 6/2021 | Chen ....................... G06V 10/75 |

FOREIGN PATENT DOCUMENTS

WO WO-2020091872 A1 * 5/2020 ......... G06K 9/00744

* cited by examiner

*Primary Examiner* — Jean Paul Cass
(74) *Attorney, Agent, or Firm* — McHale & Slavin, P.A.

(57) ABSTRACT

A video compressor system and device for securement to a drone controller. The device employs a low bandwidth, low latency video compressor, recorder and cellular modem that connect directly to the drone's handheld receiver. The video compressor high quality live video from the drone's receiver to be broadcast over a cellular network at low bandwidth rates and with low latency. The small footprint and low power consumption allows the device to be coupled directly to the drone controller, no external tethering to other larger and less mobile devices is required. The streaming video can be viewed live through a decompression sever on video walls, individual PC's and even handheld mobile devices in the field, which also allows viewers to have complete mobility while maintaining visual connection to the drone video feed.

7 Claims, 8 Drawing Sheets

DRONE VIDEO COMPRESSOR FOR REMOTE VIDEO VIEWING

PRIORITY CLAIM

In accordance with 37 C.F.R. 1.76, a claim of priority is included in an Application Data Sheet filed concurrently herewith. Accordingly, the present invention claims priority as a continuation of U.S. Provisional Patent Application No. 62/779,974 entitled "Drone Video Compressor for Remote Video Viewing", filed on Dec. 14, 2018. The contents of which the above referenced application is incorporated herein by reference in its entirety.

CROSS REFERENCE TO RELATED APPLICATIONS

Not Applicable.

STATEMENT REGARDING FEDERALLY SPONSORED RESEARCH OR DEVELOPMENT

No sponsorship of invention.

FIELD OF THE INVENTION

This invention is directed to the field of drones, also referred to as UAV and UAS (Unmanned Aerial Vehicle and Unmanned Aerial System) and, in particular, to a video compressor apparatus and method of use with drones allowing a remote transfer of a drone captured video by linking it via a cellular link such as 3G/4G/5G/LTE and the like cellular technologies to VMS systems.

BACKGROUND OF THE INVENTION

Drones have been adapted for use used with photography, inspections, visual surveillance and the like wherein high quality videos are required. For instance, U.S. Pat. No. 9,915,946 is directed to rooftop inspections with a drone. U.S. Pat. No. 7,546,187 discloses a method for navigating a drone having an on-board digital camera. U.S. Pat. No. 7,460,148 discloses a near real time video system for dissemination of video data from surveillance systems.

In operation, drones that have cameras will send the images back to the handheld drone receiver/controller which typically employs a small screen so the images can be viewed in real time. This allows the operator, referred to as the pilot, of the drone to view the live video. Unfortunately, only the pilot is viewing the video in real time. Since the pilot must remain within a certain distance of the drone to maintain connectivity, there are significant limitations on viewing the live video feed. FAA rules also specify that the drone pilot must maintain visual contact with the drone at all times.

To provide a larger live video viewing screen for multiple people to view the video, some pilots will connect their receiver/controller to a stationary television screen or large monitor. This makes for a cumbersome setup and allows only people standing in front of the screen to see the live feed. When used in law enforcement or military operations, this situation can also put personnel at risk by forcing them to view the video from a specific location.

If a drone pilot wants to broadcast the live video out to remote viewing locations away from the controller, to gain mobility, he must tether a separate modem and power supply to the controller to obtain cellular connectivity and video transmission. This is problematic because once multiple devices are tethered to the drone controller; it is difficult to use the controller as a mobile device thereby restricting the movements of the pilot. In addition, transmitting live video over a cellular network uses a large amount of bandwidth, which is expensive, and may also result in low latency, poor quality video.

What is lacking in the art is a device that allows live video transfer without complex devices tethered to the controller which could limit the portability of the controller.

SUMMARY OF THE INVENTION

Disclosed is a device that employs a low bandwidth, low latency video compressor, recorder and cellular modem that connects directly to a drone's handheld receiver. The device allows high quality live video from the drone's receiver to be broadcast over a cellular network via 3G/4G/5G/LTE and the like future cellular technologies to VMS systems such as a Milestone, View Commander, Genetec and the like at low bandwidth rates and with low latency. The live video may also be recorded. The small footprint and low power consumption allows the device to be coupled directly to the drone controller, no external tethering to other larger and less mobile devices is required. This provides the pilot with complete lightweight mobility during operation. The streaming video can be viewed live through the decompression sever on video walls, individual PC's and even handheld mobile devices in the field, which also allows viewers to have complete mobility while maintaining visual connection to the drone video feed. The on-board compressor provides a user adjustable, low bandwidth, high-quality video feed over cellular networks that may be prone to bandwidth restrictions and limited allocations.

An objective of the invention is to provide a drone video device that allows high quality live video to be collected from a drone's receiver and broadcast over a cellular network at low bandwidth rates.

Another objective of the invention is to provide drone video device that employs a low bandwidth, low latency video compressor, and cellular modem that connects directly to a drone's handheld receiver.

Another objective of the invention is to provide a streaming video that can be viewed live through a decompression server on video walls, PC's, handheld mobile devices.

Still another objective of the invention is to provide a drone video device having a small footprint that allows coupling directly to a drone controller without external tether connections.

Yet still another objective of the invention is to provide drone video device having an on-board compressor that provides a user adjustable, low bandwidth, high-quality video feed over cellular networks.

Other objectives and further advantages and benefits associated with this invention will be apparent to those skilled in the art from the description, examples and claims which follow.

DESCRIPTION OF THE PREFERRED EMBODIMENT

An embodiment of the instant invention is disclosed herein, however, it is to be understood that the disclosed embodiments are merely exemplary of the invention, which may be embodied in various forms. Therefore, specific functional and structural details disclosed herein are not to be interpreted as limiting, but merely as a basis for the claims and as a representation basis for teaching one skilled in the art to variously employ the present invention in virtually any appropriately detailed structure.

Figure 1:
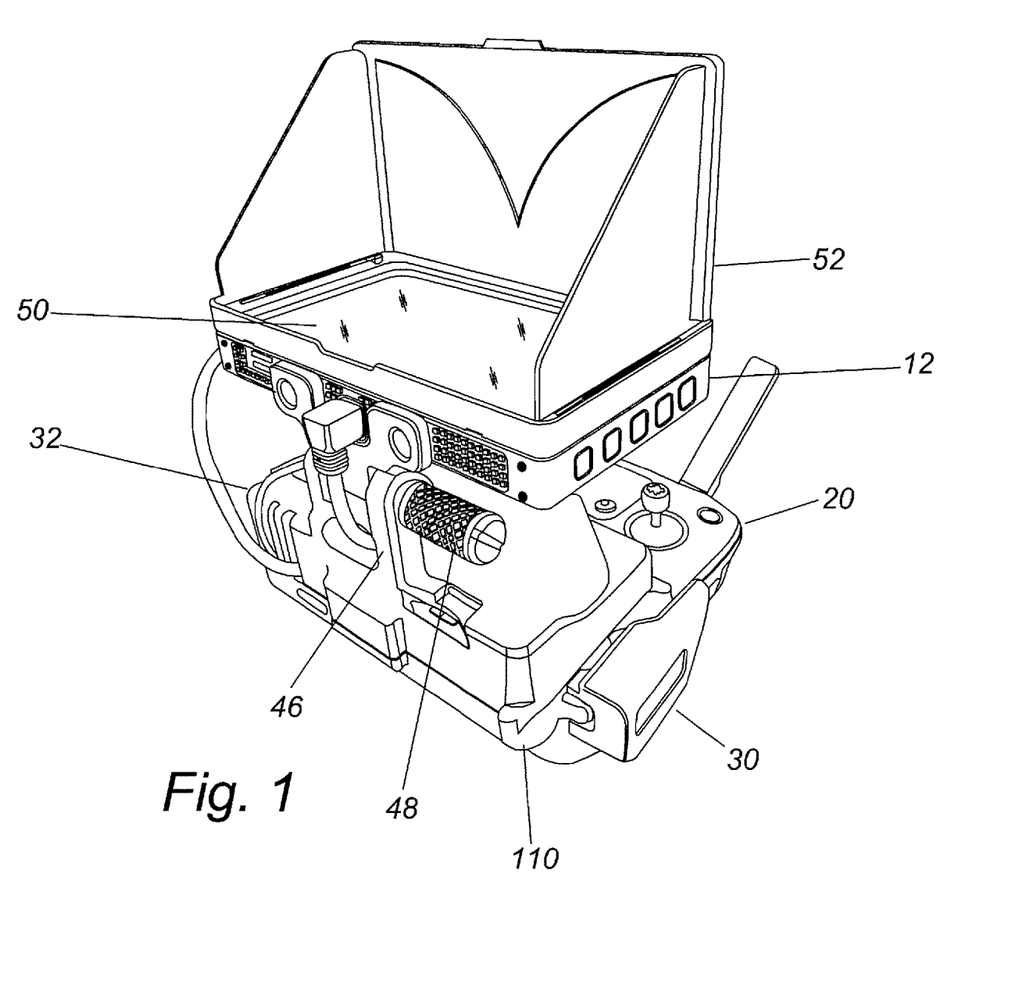
FIG. 1 is a front right perspective view of the video compressor and display screen attached to a drone controller.
Figure 2:
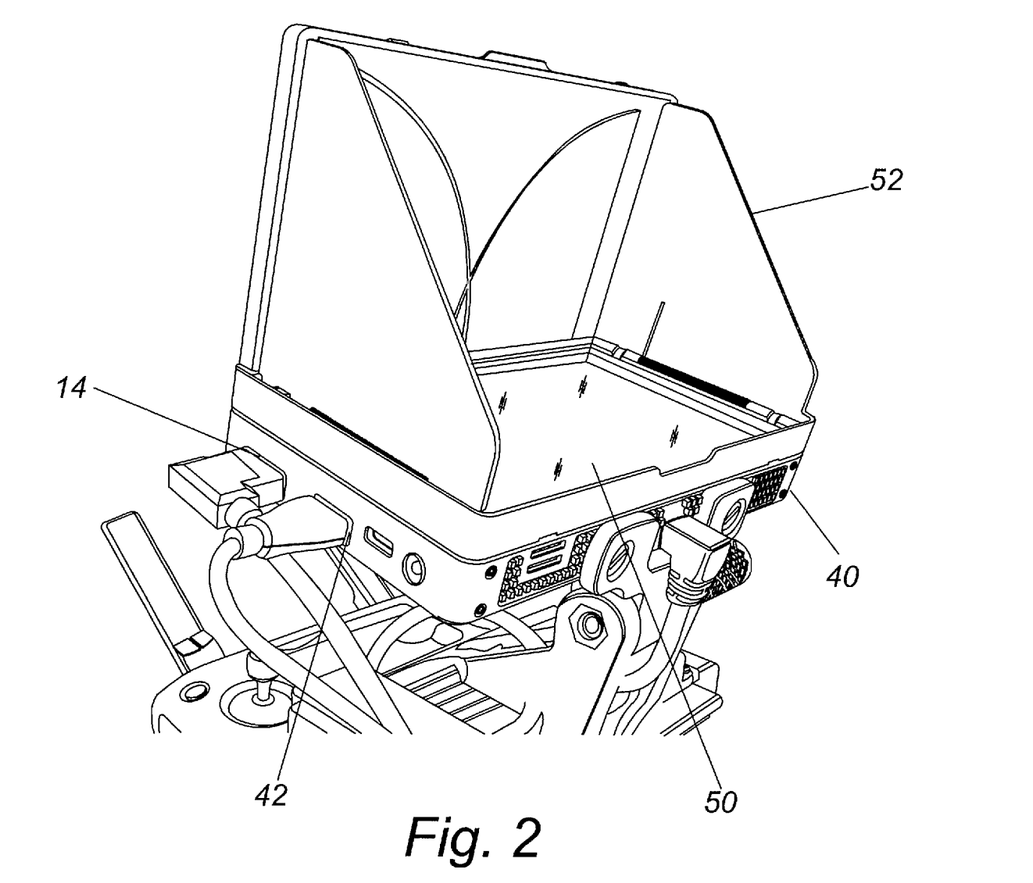
FIG. 2 is a front left perspective view thereof.
Figure 3:
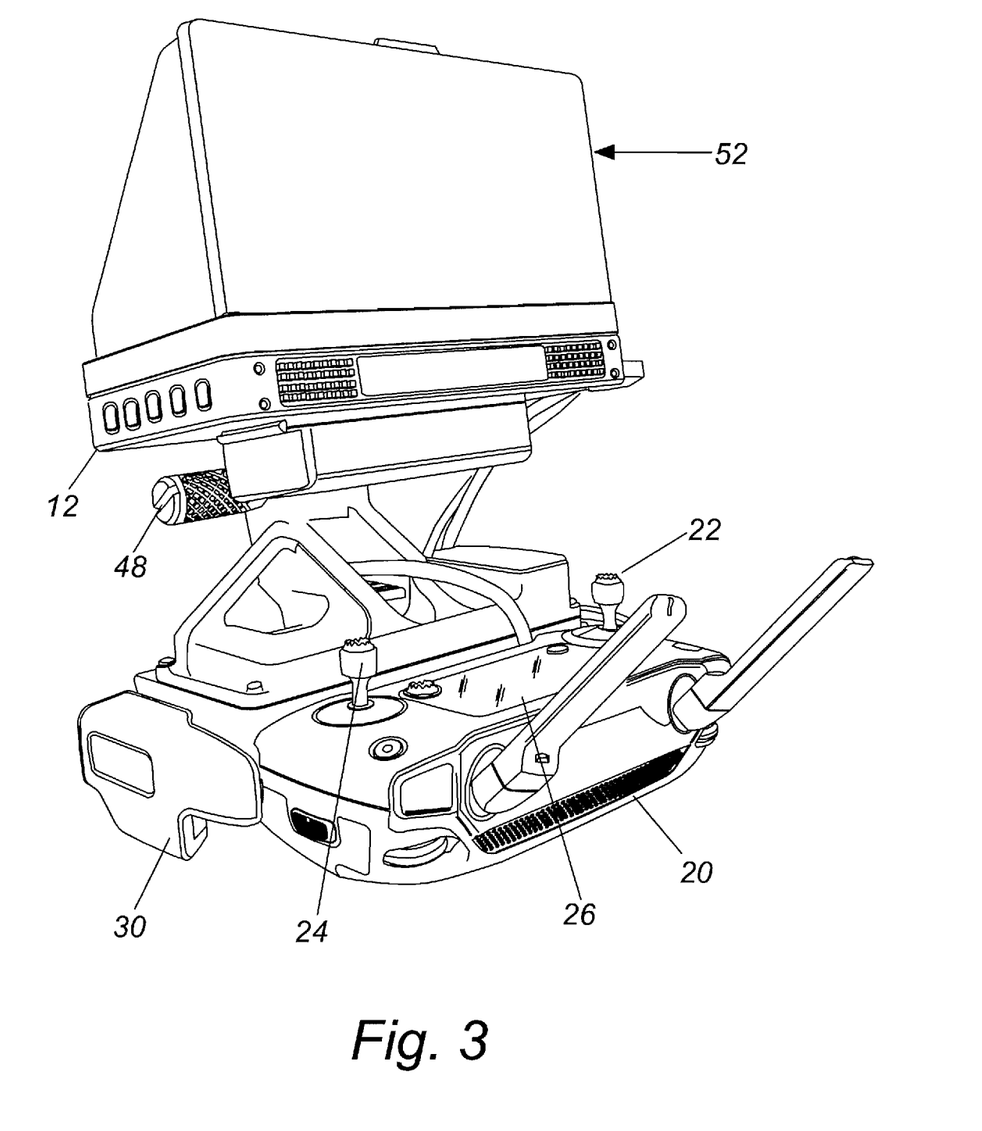
FIG. 3 is rear perspective view thereof.
Figure 4:
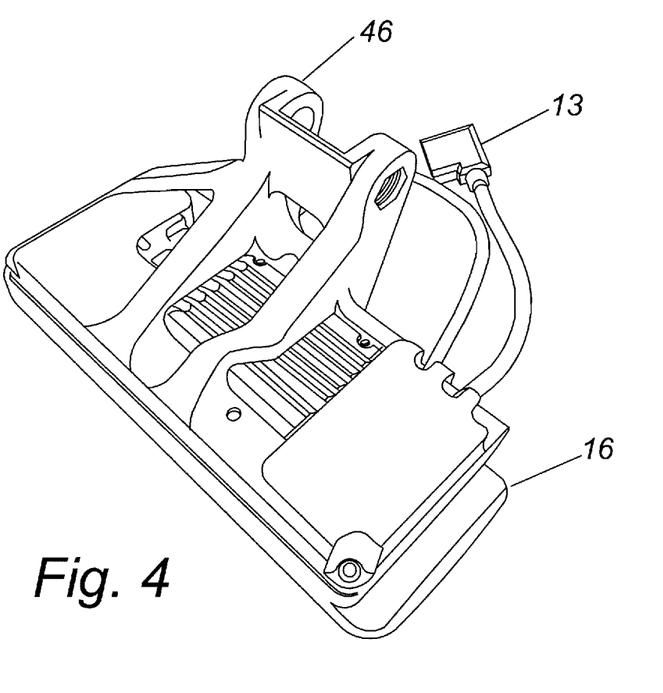
FIG. 4 is plane view of the compressor.

Referring now to FIGS. 1-3, disclosed is a video compression device that employs a low bandwidth, low latency video compressor, recorder and cellular modem 16. The device seamlessly couples to a cellular network such as Verizon, AT&T, T-Mobile, Bell & Telus, External, via 3G/4G/5G/LTE and the like future cellular technologies to VMS systems such as a Milestone, Genetec and the like using low bandwidth rates with low latency. An HDMI camera interface 14 is provided, the input video interface is HDMI 1.4. The on-board compressor 16 provides a high quality video feed over the limited bandwidth cellular network. The compressor 16 makes a connection to its decompression server located on the internet. An associated internet server webpage can be configured to compress the video at a specific level to suit the video quality requirements and cellular service. From the decompression server, the video is delivered to the VMS as a locally connected ONVIF compliant stream.

The device operates as part of a system for remotely transferring real time video from an Unmanned Aerial System (drone), not shown, wherein live streaming of images from the real time video displayed on the drone controller can also be viewed remotely.

In one embodiment a drone controller 20 having control yokes 22 and 24 is wirelessly coupled to a drone. The drone includes a video camera capable of capturing live streaming images in the form of video data for display screen 50 typically formed either integral with the drone controller 60 or as an additional display component 12, mounted to a controller 20. Conventional drone cameras and operational signals are transmitted at frequencies of about 2.4 and 5.8 GHz. In one embodiment the video compressor 16 attached to the drone controller 20 using clamps 30 and 32. The video data output from the drone controller 20 is coupled to the cellular transmitter 16 with a removable plug 13 at HDMI input 14. USB port 42 provides power to the video compressor 16. The video compressor 16 includes a bracket 46 with a tilt hinge 48 allowing the positioning of a display screen 50. The display screen may include a sun shield 52 to allow better viewing in sunlight conditions.

The video compressor 16 is constructed and arranged to condense video data output into a compressed video having low bandwidth and low latency. The cellular modem, integrated within the video compressor 16, is used to upload compressed video to the internet by use of the cellular network. A decompression server is located on the internet for receipt of the compressed video data wherein the decompression server decompresses the video data allowing standard VMS systems to connect to the video streams allowing live streaming review from a remote location.

The compression efficiency, due to the complexity of the real time video, recommended rates are in the 10-1000 kbps range to preserve the video detail. This translates up to 100 flight hours per month on a standard 25 GB/month plan. Compression works on an algorithm assigning binary codes to pixels shrinking file sizes in the process.

The modem 16 is integrated in the system, reducing size, power consumption and complexity of the system. The display 26 illustrates the system status. The video compression device draws less than 2.5 W using its internal modem. The input voltage range is 5 VDC and a modem SIM card provides either dynamic or static IP. The operator of the drone receives the video data from the drone having a mounted video camera in an assembly known in the prior art. The video data received from the video camera is received by the drone controller wherein the instant device creates a compressed video that can be forwarded to an internet located server by a conventional cellular network. The internet located server decompresses the video and makes the decompressed video accessible through an Onvif or RTSP connection, allowing standard video management systems to connect to the video stream. The device allows high quality live video from the drone's handheld receiver to be broadcast through the cellular connection to the internet for decompression.

The drone video compressor for coupling to a drone controller is formed into a mounting bracket 46 for securement to a drone controller 20. The self contained video compressor 16 having a means for condensing real time video data received a drone mounted video camera, not shown. The video data is condense to a predefined low bandwidth having low latency to form a compressed video.

Figure 5:
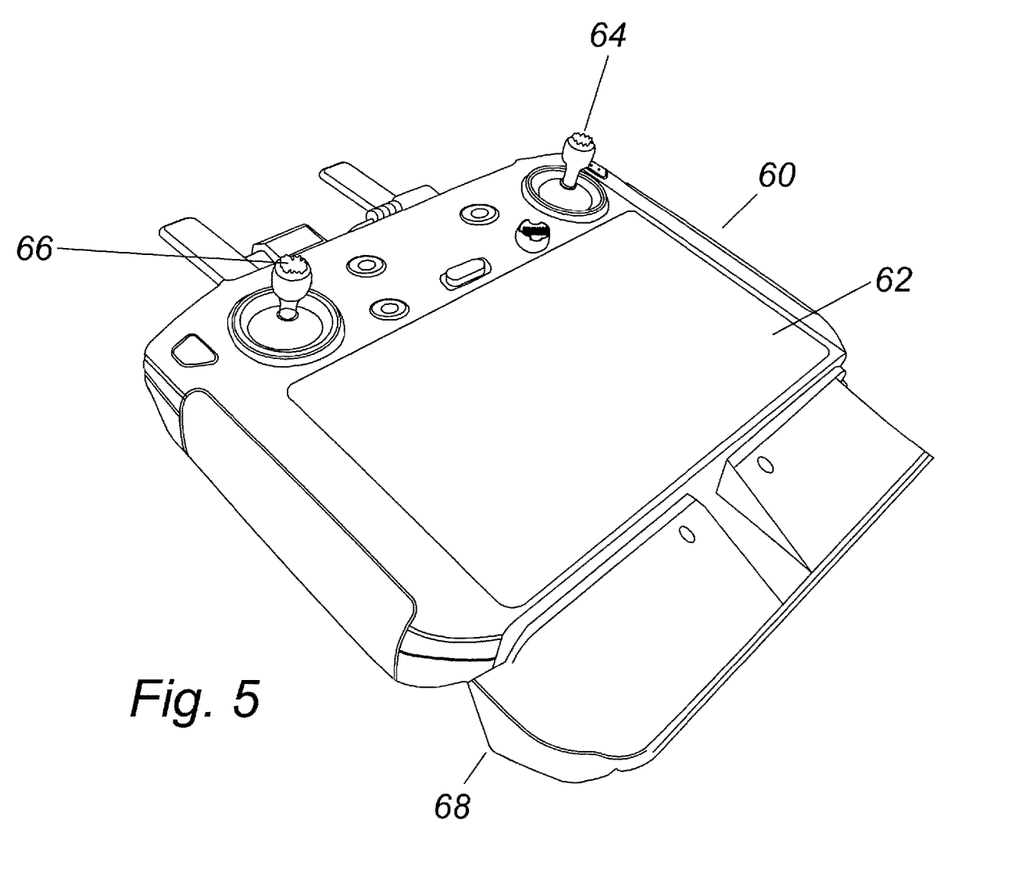
FIG. 5 is a front plane view of the video compressor formed integral to a drone controller.
Figure 6:
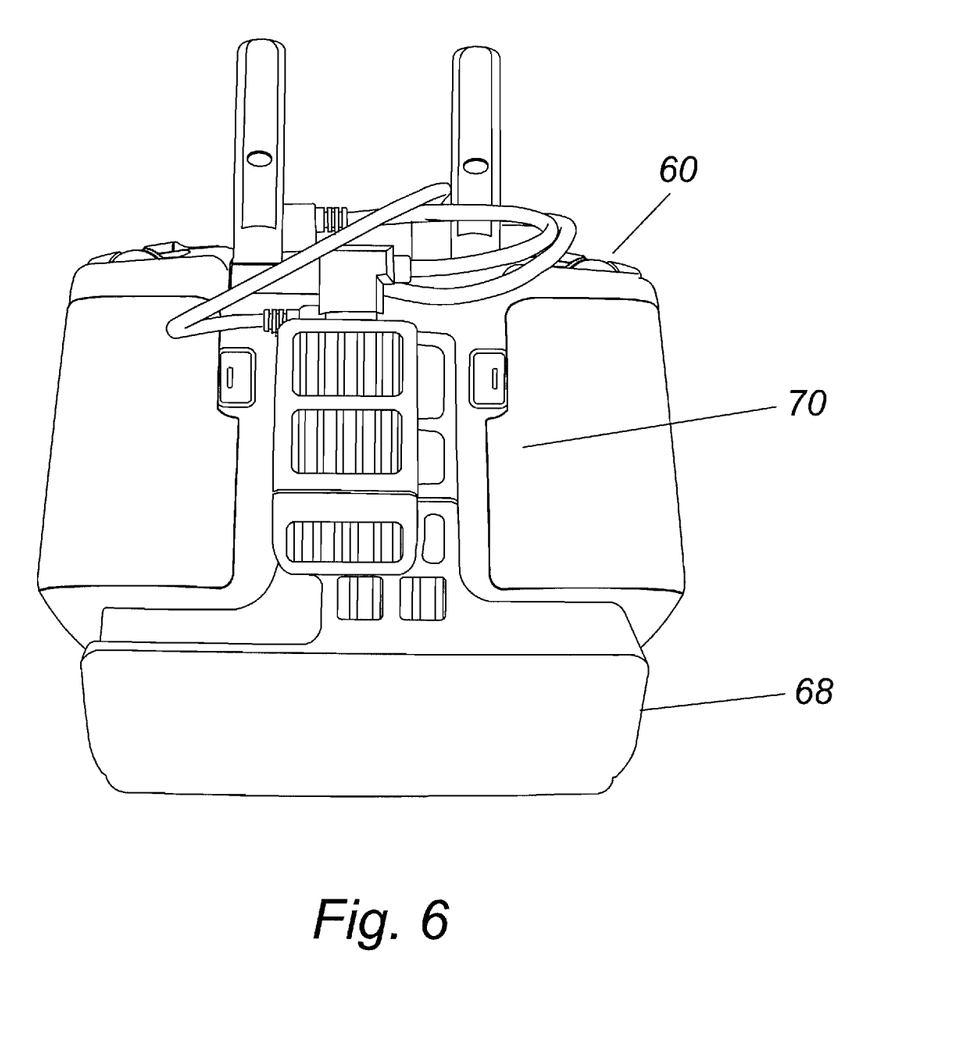
FIG. 6 is a rear view thereof.

In an alternative embodiment the drone controller 60 includes an integrated screen display 62 which is coupled to the drone camera. The pilot yokes 64 and 66 control the drone. In this embodiment a cellular modem and compressor 68 are coupled to the rear 70 of the drone controller 60. As in the previous embodiment the video compressor is constructed and arranged to upload compressed video to the cellular network to access an internet placed server. As with the previous embodiment, a video decompressor is located on the internet placed server wherein the video decompressor converts compressed video to a VMS accessible through an HTTP connection. The real time video can be viewed live on video walls, individual PC's and handheld mobile devices remotely located from said drone. The video data delivered is a locally connected ONVIF compliant stream.

Figure 7:
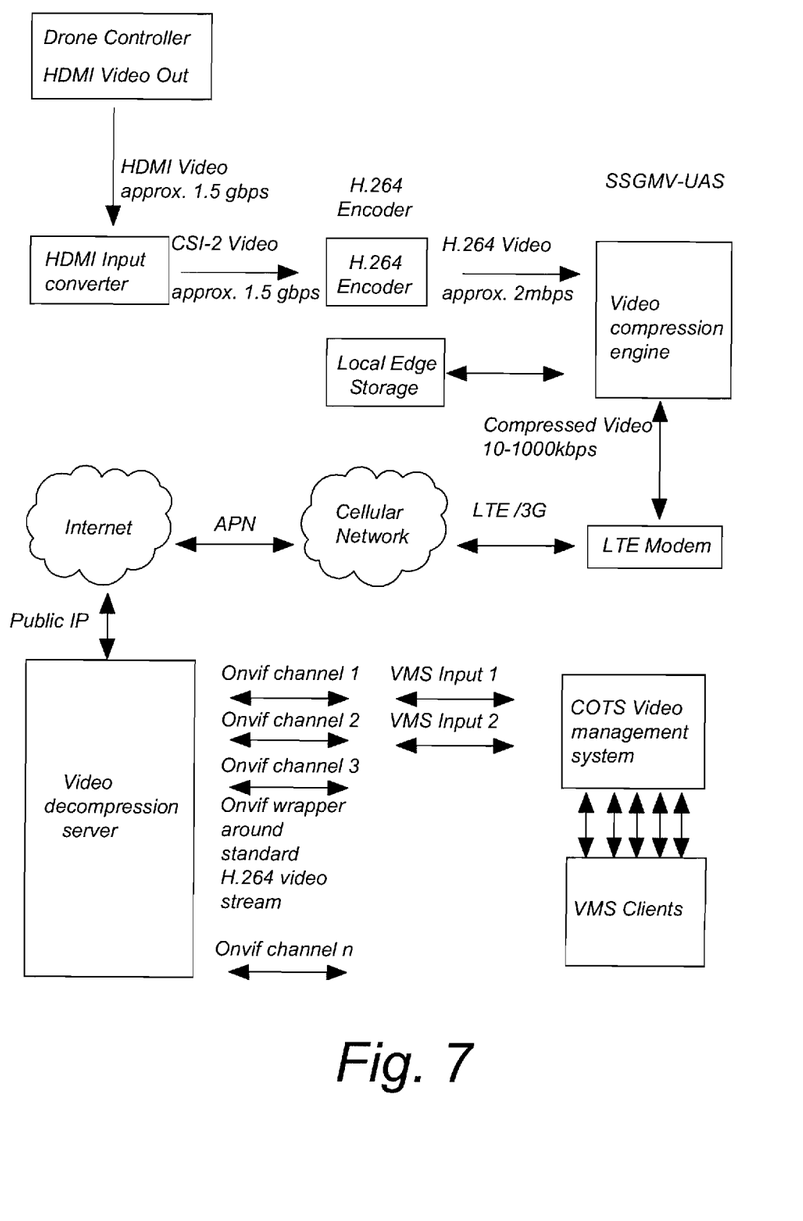
FIG. 7 is a functional block diagram of the system for remotely transferring real time video from the drone controller illustrating the functional steps from HDMI output to VMS connection.
Figure 8:
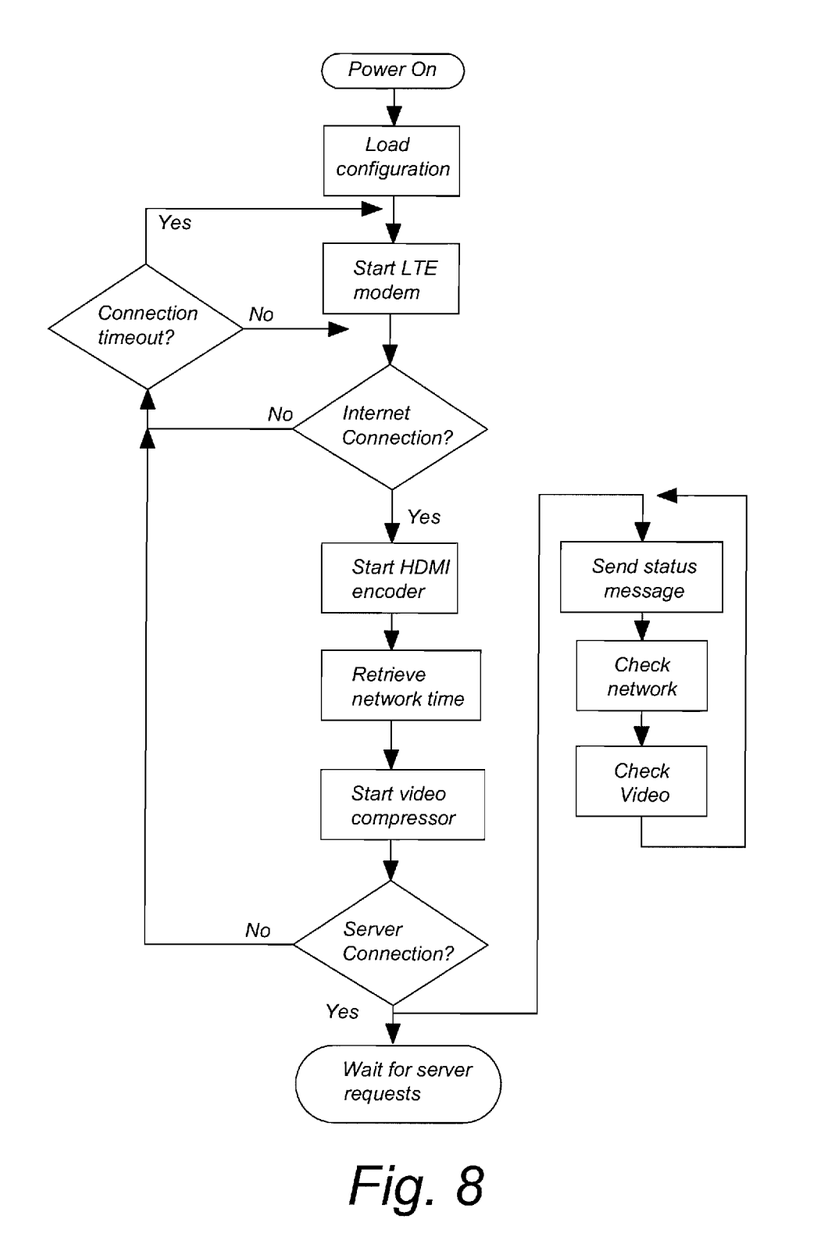
FIG. 8 is flow diagram regarding system checks.

FIG. 7 is a functional block diagram of the system depicting the HDMI output from the drone controller which is converted in to CSI-2 video and transferred at a rate of about 1.5 gbps to an encoder. The encoder transfers H.264 video at a rate of about 2 mbps to a video compression engine. The compressed video can be stored or transferred at a rate between 10-1000 kbps through a cellular moment to the internet. A video decompression server is stationed on the internet to decompress the compressed video and make this available as standard H264 video using an Onvif wrapper to a Video Management System (VMS) for access by VMS clients. FIG. 8 is a flow diagram of the system check when powered on. Load configuration is initiated with a modem which checks for internet connection. With internet connection available, the HDMI encoder is started, first retrieving network time and starting of a video compressor.

If server connection is found then server requests are made and the status messaged, network and video are checked.

The system provides a method of remotely transferring real time video from an Unmanned Aerial System (drone) comprising the steps of: coupling a video compressor to a drone controller video data output; compressing video data output from a camera mounted drone controlled by said drone controller; forwarding said compressed video data to the internet through a cellular modem coupled to said video compressor; decompressing said compressed video data through a decompression server coupled to said internet; wherein live streaming images from said drone controller video output are displayed on said drone controller and can be viewed remotely from said drone controller in real time through either direct connection of a video viewer to the output of the decompression server, or via a video management system connected to the output of the decompression server.

For example, a pilot may use a drone for surveillance of an individual suspect. By use of the instant invention, real time video from the surveillance is compressed into a data format suitable for transfer over conventional wireless networks to an internet located server. The compressed data is then decompressed for wherein it is forward to VMS and made accessible through an HTTP connection. The streaming video can be viewed live through the decompression sever on video walls, individual PC's and even handheld mobile devices in the field, which also allows viewers to have complete mobility while maintaining visual connection to the drone video feed. In this example, any law enforcement individual may watch the real time video of the suspect individual using a conventional smart phone. The device dimensions of approximately 3.6"×1.7"×1.0" provides such a small footprint that the drone controller remains extremely mobile allowing the pilot to move uninhibited.

The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a method or device that "comprises," "has," "includes" or "contains" one or more steps or elements, possesses those one or more steps or elements, but is not limited to possessing only those one or more elements. Likewise, a step of a method or an element of a device that "comprises," "has," "includes" or "contains" one or more features, possesses those one or more features, but is not limited to possessing only those one or more features. Furthermore, a device or structure that is configured in a certain way is configured in at least that way, but may also be configured in ways that are not listed. The term "about" means, in general, the stated value plus or minus 5%.

All patents and publications mentioned in this specification are indicative of the levels of those skilled in the art to which the invention pertains. It is to be understood that while a certain form of the invention is illustrated, it is not to be limited to the specific form or arrangement herein described and shown. It will be apparent to those skilled in the art that various changes may be made without departing from the scope of the invention and the invention is not to be considered limited to what is shown and described in the specification and any drawings/figures included herein.

One skilled in the art will readily appreciate that the present invention is well adapted to carry out the objectives and obtain the ends and advantages mentioned, as well as those inherent therein. The embodiments, methods, procedures and techniques described herein are presently representative of the preferred embodiments, are intended to be exemplary and are not intended as limitations on the scope. Changes therein and other uses will occur to those skilled in the art which are encompassed within the spirit of the invention and are defined by the scope of the appended claims. Although the invention has been described in connection with specific preferred embodiments, it should be understood that the invention as claimed should not be unduly limited to such specific embodiments. Indeed, various modifications of the described modes for carrying out the invention which are obvious to those skilled in the art are intended to be within the scope of the following claims.

The invention claimed is:

1. A system for remotely transferring real time video from a drone comprising:
   a drone wirelessly coupled to a drone controller, said drone including a video camera capable of capturing live streaming images in the form of video data for display on said drone controller and video data output therefrom;
   a video compressor attached to said drone controller video data output, said video compressor constructed and arranged to condense said video data output into a compressed video wherein said video data received from said camera is in HDMI format and converted into CSI-2 video at about 1.5 gbps and encoded in H.264 video at about 2 mbps before compression;
   a cellular modem coupled to said video compressor constructed and arranged to upload said compressed video at a compression video transfer rate between 10-1000 kbps to a cellular network; and
   internet placed decompression server for receipt of said compressed video, said decompression server decompressing said video data;
   wherein live streaming images displayed on said drone controller can also be viewed remotely from said drone controller, either directly by streaming video from the output of the decompression server, or through the use of a video management server connected to the output of the decompression server as a locally connected ONVIF compliant stream having low bandwidth and low latency.

2. The system for remotely transferring real time video from a drone according to claim 1 wherein said cellular network is 3g, 4f, 5g, or LTE cellular technologies.

3. The system for remotely transferring real time video from a drone according to claim 1 wherein said video data is accessible through an HTTP connection.

4. The system for remotely transferring real time video from a drone according to claim 1 wherein said video compressor is formed integral with said cellular modem.

5. A method of remotely transferring real time video from a drone comprising the steps of:
   coupling a video compressor to a drone controller video data output;
   compressing video data output from a camera mounted drone controlled by said drone controller wherein said video data received from said camera is in HDMI format and converted into CSI-2 video at about 1.5 gbps and encoded in H.264 video at about 2 mbps before compression;
   forwarding said compressed video data to the internet through a cellular modem coupled to said video compressor at a compression video transfer rate between 10-1000 kbps to a cellular network;

decompressing said compressed video data through a decompression server coupled to said internet;

a video compressor attached to said drone controller video data output, said video compressor constructed and arranged to condense said video data output into a compressed video;

wherein live streaming images from said drone controller video output are displayed on said drone controller and can be viewed remotely from said drone controller in real time, either directly by streaming video from the output of the decompression server, or through the use of a video management server connected to the output of the decompression server as a locally connected ONVIF compliant stream having low bandwidth and low latency.

6. The method of remotely transferring real time video from a drone according to claim 5 wherein said video data is accessible through an HTTP connection.

7. The method of remotely transferring real time video from a drone according to claim 5 including the step of storing compressed video.

* * * * *